INVENTORS
WILLIS E. DAY
DONALD E. PHILLIPS
BY Moody and Kintzinger
ATTORNEYS

INVENTORS
WILLIS E. DAY
DONALD E. PHILLIPS
BY
Moody and Kintzinger
ATTORNEYS

United States Patent Office 3,426,266

Patented Feb. 4, 1969

3,426,266

SIGNAL MODULATED SELF-REGULATED SWITCHING VOLTAGE REGULATOR-AMPLIFIER

Willis E. Day and Donald E. Phillips, Cedar Rapids, Iowa, assignors to Collins Radio Company, Cedar Rapids, Iowa, a corporation of Iowa Filed Mar. 22, 1966, Ser. No. 536,465

U.S. Cl. 323—22 17 Claims

Int. Cl. G05f *1/40;* H03k *1/12*

ABSTRACT OF THE DISCLOSURE

A signal modulated self-regulated voltage regulator-amplifier utilizing self-oscillation with feedback to a "bang-bang" control circuit with a discontinuous amplitude action feedback loop. It provides amplification action of considerable gain particularly with a modulating input signal across a relatively high impedance and the output across relatively low impedance. Further, a low power AC signal modulated embodiment is provided developing a relatively high AC power output with an extremely high gain factor.

Figure 1:
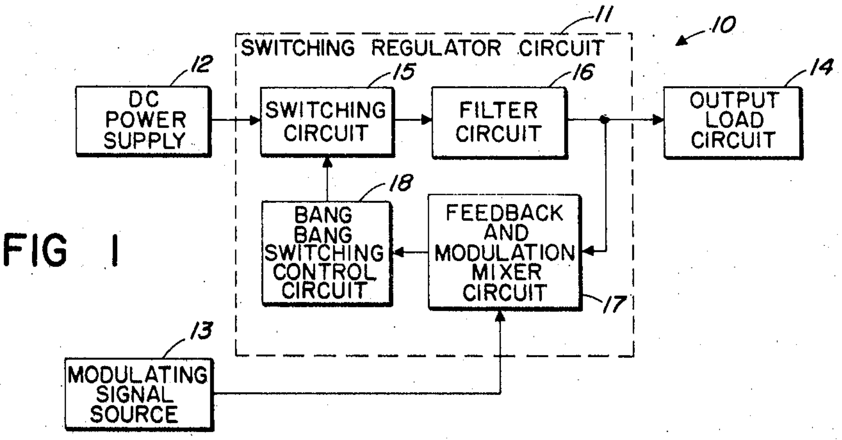

This invention relates in general to voltage regulators, and in particular, to signal modulated self-regulated switching voltage regulator-amplifiers with a signal input applied to modulate a feedback circuit of such regulator-amplifiers.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

Regulator-amplifiers of this nature are needed to attain higher efficiency levels with RF linear amplifiers through providing a very efficient modulated B+ voltage for high power stages of such amplifiers and thereby attaining maximum efficiency with the amplifiers. Such regulated voltage supplies would permit such amplifiers to work with a lower DC supply B+ voltage since distortion caused with a flat topping action of envelope peaks is greatly reduced with reshaping of the envelope attained through using such a modulated B+ regulator supply. It should also be noted that in order to meet strict power output efficiency requirements, the output B+ voltage must be well regulated for reducing variations otherwise necessitating higher nominal output power settings that otherwise counter, at least to some extent, efforts expended in other ways to increase efficiency. Obviously, the regulator itself must be highly efficient in order that overall efficiency goals may be realized.

Various existing regulators generally leave one thing or another to be desired in meeting tightened structural requirements and/or improved performance results. Loss type DC regulators, for example, while usable in modulated regulator systems, are much too inefficient, dissipate too much heat, and require more input power than is acceptable under certain circumstances leading to an unacceptable increase in power supply demands. Such requirements may be, for example, larger batteries and other heavy duty component requirements greatly exceeding contract specification limitations. Various variable pulse width systems usable in an alternate approach are generally not regulated supplies or have a low speed continuous feedback loop with an inherent instability problem seriously limiting maximum modulating frequency levels.

It is, therefore, a principal object of this invention, to provide improved regulator-amplifiers having inherent self-regulations with the output not only controlled by the modulating signal input but regulated to it.

Another object is to provide such a regulator-amplifier requiring very low power for control with effective load resistance being relatively low as compared to a relatively high impedance to input signals to thereby provide a relatively large signal power gain. For example, 10 milliwatts of audio may control a 50-watt DC output with such a regulator-amplifier.

A further object is to provide a power supply modulator and linear amplifier system that does not require that the average value of DC voltage applied to modulated tube elements or other amplifying device electrodes be constant.

Another object is to attain very high efficiency with control extending down to zero frequency when and where desired.

A further object is the attainment of linear operation particularly with the use of passive elements in the control circuitry of such regulator-amplifiers.

Another object is simplification and circuit simplicity with no multi-vibrator and/or pulse width controls required.

Still another object is to achieve a high degree of active filtering of supply voltage variations with the output voltage being a regulated voltage at all times even though it is varied at an audio rate.

Features of this invention useful in accomplishing the above objects include, in a signal modulated self-regulated voltage regulator-amplifier circuit, a switching type voltage stepdown regulating action along with a modulating input signal control circuit including, as a part thereof, a feedback loop allowing AC or modulation varied DC control of the regulator-amplifier output. It includes a switching circuit with an on-off switch device and a DC power supply connected to the switching circuit. A switching control circuit is connected to the switching circuit and to a combined feedback and modulating signal input mixing circuit interconnecting the output of the regulator-amplifier circuit and the switching control circuit. A filter circuit is employed that converts the output signal to a DC regulating voltage at least as applied back through the feedback circuit. Furthermore, the operating impedance of the feedback circuit to the DC regulating voltage levels is, as related to the output load impedance, by predesign at a very much higher impedance level. This provides for the attainment of the desired regulator amplifying action, and along with high modulating signal input impedance, matched in accordance with predetermined standards to the feedback signal impedance, the attainment of very large signal power gain. Further, both these features are provided in a regulator-amplifier having an inherent self-regulating action with the output not only controlled by the input but regulated to it.

Specific embodiments representing what are presently regarded as the best modes for carrying out the invention are illustrated in the accompanying drawings.

Figure 2:
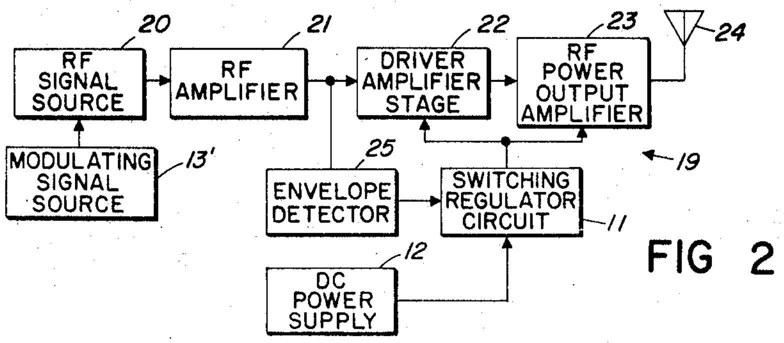
Figure 3:
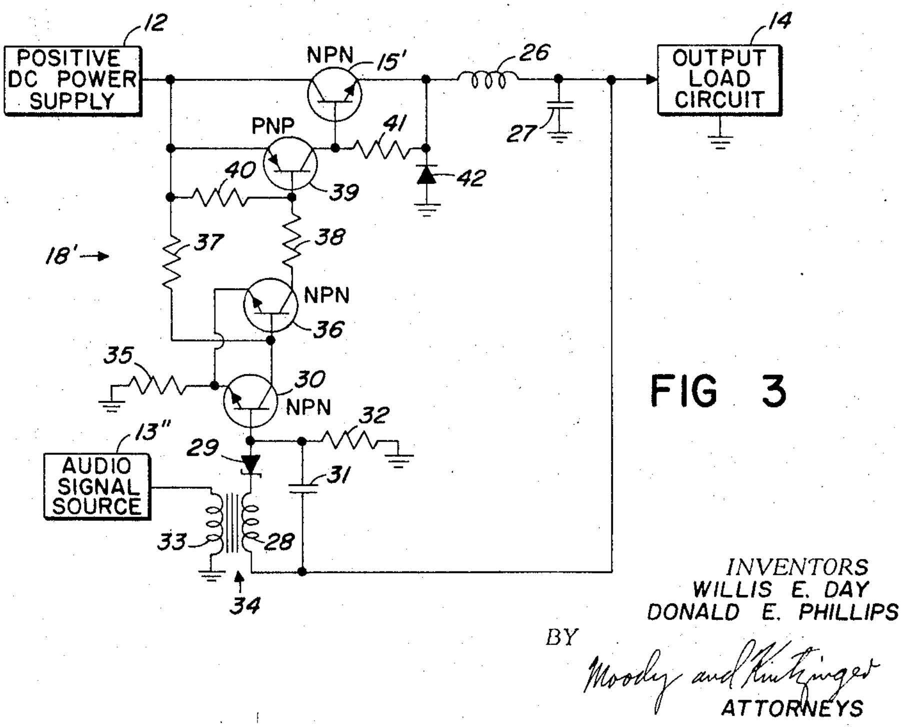
Figure 8:
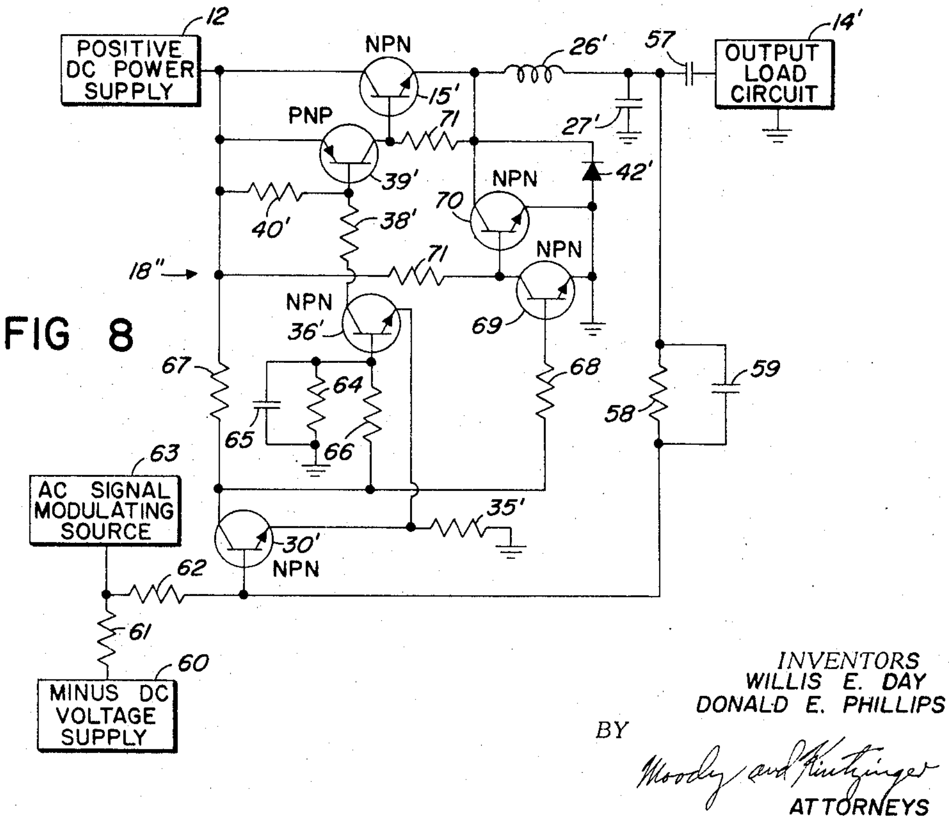

In the drawings:

FIGURE 1 represents a block diagram of a signal modulated self-regulated voltage regulator-amplifier circuit showing a switching regulator circuit connected to receive a DC power supply input, a modulating signal input from a modulating signal source and connected to an output load circuit;

FIGURE 2, a block diagram of a high efficiency linear amplifier as may be used for SSB or other linear amplifier operation;

FIGURE 3, a schematic of a high efficiency regulator-amplifier circuit used in providing a modulated DC power output signal from a signal modulated self-regulated voltage regulator-amplifier with an audio modulating signal input through a signal coupling transformer to a feedback circuit of the regulator-amplifier circuit;

FIGURES 4, 5, 6, and 7, illustrate various modulating signal input and feedback circuit variation embodiments with respect to the basic circuit of FIGURE 3; and, FIGURE 8, a schematic of a signal modulated self-regulated voltage regulator-amplifier circuit having an AC signal modulating input and developing an AC output signal.

Referring to the drawings:

The signal modulated self-regulated voltage regulator-amplifier circuit 10 of FIGURE 1 is shown to include a switching regulator circuit 11 receiving a DC power input from DC power supply 12, a modulating signal input from modulating signal source 13 and an output connection to an output load circuit 14. Within the regulator circuit 11 the DC power supply 12 is connected directly to a switching circuit 15 with an output fed to and through filter circuit 16 with an output connection to the output load circuit 14. The output of filter circuit 16 is also connected to a feedback and modulation mixer circuit 17 receiving a modulating signal input from modulating signal source 13 at a signal mixer portion of the feedback circuit 17. The output of the feedback and modulation mixer circuit 17 is connected for feeding a controlling voltage input to what is known in the trade as a "bang-bang" type circuit, in other words, a voltage level responsive or triggered switching control circuit 18 which in turn is connected for driving switching circuit 15. This provides for operation with the output not only controlled by the modulating signal input but regulated to it.

In the high efficiency linear amplifier 19 of FIGURE 2, which may be adapted for the transmission of SSB and particularly for linear amplifier operation in a transmitter system, the switching regulator circuit 11 such as indicated in greater detail in FIGURE 1, is provided with a DC power input from a DC power supply 12 just as with the other embodiment. The modulating signal, however, instead of coming directly from an independent modulating signal source is obtained from a modulating signal source 13′ that modulates an RF signal source 20. Signal source 20 provides an RF signal modulated output to an RF amplifier 21, the output of which is passed through a driver amplifier stage 22 and on through an RF power output amplifier 23 with the ultimate output being transmitted to antenna 24 for transmission of an appropriate RF signal. The output of RF amplifier 21 with a modulated signal originating from modulating signal source 13′ is also passed to envelope detector 25 which provides a detected envelope output signal as the modulating input signal to switching regulator circuit 11.

Referring now to the embodiment of FIGURE 3 for a more detailed schematic of a high efficiency regulator-amplifier useful in providing a DC power output modulated signal to output load circuit 14. A positive DC power supply 12 is connected to the collector of "on"-"off" switch acting NPN transistor 15′ which, with its connection to the "bang-bang" switching control circuit 18′, is the switching equivalent of switching circuit 15 of FIGURE 1. The output emitter of NPN transistor 15′ is connected through coil 26 to output load circuit 14. The connection between coil 26 and the output load circuit 14 is connected through capacitor 27 to ground with the coil 26 and capacitor 27 forming the equivalent of the filter circuit 16 of FIGURE 1. The connection between coil 26 and the output load circuit 14 is connected through a feedback line to an input signal secondary coil 28 and through the coil 28 to and through Zener diode 29 to the base of NPN transistor 30. A capacitor 31 is connected in parallel across the serially connected coil 28 and Zener diode 29, and the junction of Zener diode 29 and the base of transistor 30 is connected through resistor 32 to ground. Input signals from audio signal source 13″ are fed to one end of the primary coil 33 of the signal input transformer 34 and with the other end of coil 33 connected to ground.

The emitter of NPN transistor 30 is connected both through resistor 35 to ground and to the emitter of NPN transistor 36. The collector of NPN transistor 30 is connected to the base of NPN transistor 36, and the common junction between transistor 30 and the base of transistor 36 is connected through resistor 37 to the output of positive DC power supply 12. The collector of NPN transistor 36 is connected through resistor 38 to the base of PNP transistor 39. The common junction of resistor 38 and the base of transistor 39 is connected through resistor 40 to the output of positive DC power supply 12, and the emitter of transistor 39 is directly connected to the output of positive DC power supply 12. The collector output of PNP transistor 39 is connected to the base of "on"-"off" switch acting NPN transistor 15′ as driven by the "bang-bang" switching control circuit 18′. The common junction between the collector of transistor 39 and the base of transistor 15′ is connected through resistor 41 to the common junction between the emitter of transistor 15′ and coil 26, and this common junction is also connected through diode 42 to ground with diode 42 connected cathode to the common junction between transistor 15′ and coil 26 and anode to ground. Diode 42 functions as a free-wheeling clamp keeping choke coil 26 from swinging the voltage below ground.

During operation of the regulator-amplifier circuit embodiment of FIGURE 3 in developing a modulated DC power output when power is first applied from positive DC power supply 12, NPN transistor 36 is turned on with the biasing voltage developed through resistor 37. Then with turn on of transistor 36 turn on voltage bias is applied to turn on PNP transistor 39. This, of course, results in the turning on of NPN transistor 15′ in a switch-on action connecting the output of positive DC power supply 12 through transistor 15′ to choke coil 26. Obviously, current in choke coil 26 and the output voltage rise at rates as determined by choke coil impedance, the value of capacitor 27, and the load impedance of output circuit 14. When the output voltage being fed output circuit 14 reaches a level sufficient to bias Zener diode 29 to full switched-on conduction, NPN transistor 30 is generally turned on thereby providing a short, and removal of firing to conduction bias, between the base and emitter of NPN transistor 36. This, of course, results in shut off of transistor 39 and resulting switch off control of NPN transistor 15′. Current flow from choke coil 26 then is drawn through diode 42 until such time as the output voltage being fed to output circuit 14 drops to a point where transistor 30 is cut off at which time the turn on cycle is re-initiated providing immediate control of NPN transistor switch 15′ to the "on" state with the cycle being repeated time after time. This develops a ripple voltage in the output fed to output circuit 14 that is relatively small since the gain of transistors 30, 36, 39 and 15′ is quite high. The required control signal at the base of transistor 30 for biasing to conduction is very small to thereby accomplish shut off of the "bang-bang" switching control circuit 18′ and switching to off of switching circuit transistor 15′. The voltage potential developed at the base of transistor 30 with current flow through resistor 32 when Zener diode 29 is fired to conduction is approximately at the voltage bias level control threshold for conduction of transistor 30. This voltage potential biasing of transistor 30 is such that the ripple voltage in the output as fed through capacitor 31 is sufficient to generally turn transistor 30 on and off. This operation results in a regulated DC power output voltage that approximates, voltage-wise, the voltage required to bias Zener diode 29 to conduction. The ripple voltage, obviously, may be filtered further in the output after the feedback connection, if desired.

When an AC input signal voltage from audio signal source 13″ is applied to the primary coil 33 of transformer 34, a corresponding resulting modulating voltage is induced in the secondary coil 28, in series with the Zener diode 29, as the signal mixer input in the feedback circuitry of the regulator-amplifier embodiment of FIGURE 3. This varies effective voltage of the Zener diode 29 alternately raising and lowering the voltage in a modulating action consistent with the input signal from signal source 13″. Further, this results in corresponding variations in the threshold of oscillation for output ripple developed across capacitor 27 on the power signal output line so that the power output voltage imposed across the output load circuit 14 varies proportionately to the modulating input signal. Since a load resistance for output circuit 14 of approximately 10 ohms was used in a working circuit in accordance with the embodiment of FIGURE 3 and the input signal impedance was relatively very high, a very large power gain was achieved along with a continuous regulation of the power output.

Components and values used in a regulator-amplifier constructed as shown with the embodiment of FIGURE 3, giving a high gain regulated D.C. power 40 watt peak output include the following:

| | |
|---|---|
| Positive DC power supply **12** | 2N2849. |
| NPN transistor **15′** | 40 volts. |
| Choke coil **26** | 270 μh. |
| Capacitor **27** | 2.7 μf. |
| Zener diode **29** | 1N4104 (approx. 10–12 volts). |
| NPN transistors **30** and **36** | 2N915. |
| Capacitor **31** | 22 pf. |
| Resistor **32** | 10K ohms. |
| Transformer **34** | Audio frequency coupling with very high secondary impedance. |
| Resistor **35** | 33 ohms. |
| Resistor **37** | 33K ohms. |
| Resistor **38** | 3.3K ohms. |
| PNP transistor **39** | 2N2907. |
| Resistor **40** | 150 ohms. |
| Resistor **41** | 47 ohms. |
| Power diode **42** | 1N3886. |

The feedback signal circuit impedance of the regulator-amplifier using the above components was in the neighborhood of approximately 75K ohms and the modulating nal input signal effective impedance through the secondary coil 28 to input signals from audio signal source 13′ was approximately the same.

Figure 4:
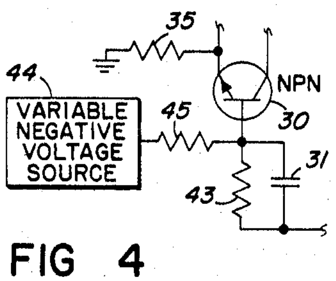

Referring now to the embodiment of FIGURE 4 wherein portions of the circuit not shown are substantially the same as corresponding portions of the embodiment of FIGURE 3 and components substantially the same are numbered the same. The feedback circuit is shown to be adapted to a different modulating signal input circuit. In this embodiment, the resistor connection 32 to ground and Zener diode 29 are omitted and a resistor 43 in the feedback circuit is connected in parallel with capacitor 31 in place of the coil 28 and Zener diode 29 of FIGURE 3. The embodiment of FIGURE 4 also includes a variable negative voltage source 44 that is connected through resistor 45 to the common junction of resistor 43, capacitor 31 and the base of NPN transistor 30. In a working regulator-amplifier constructed according to the embodiment of FIGURE 4, capacitor 31 was a 47 pf. capacitor, resistor 43 was a 22K ohm resistor, variable negative voltage source 44 was variable in the range from 0 to −10 volts as a modulating signal source and resistor 45 was a 10K ohm resistor. Here again, wath the output load circuit impedance being approximately 10 ohms, there is a very great gain factor from the modulating signal input to the modulated DC power output.

Figure 5:
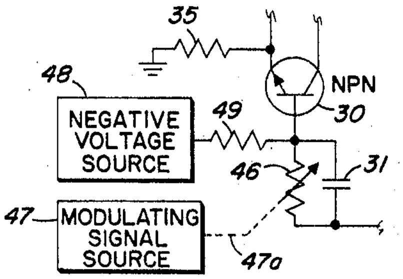

Referring now to the embodiment of FIGURE 5, an adjustable value resistive device 46 is connected in parallel, in the feedback circuit, with capacitor 31 and is adjustably driven by modulating signal source 47 through a mechanical drive 47a or any other such operationally equivalent structure. Furthermore, a negative voltage source 48 is connected through resistor 49 to the common junction of adjustable value resistor 46, capacitor 31 and the base of NPN transistor 30.

Figure 6:
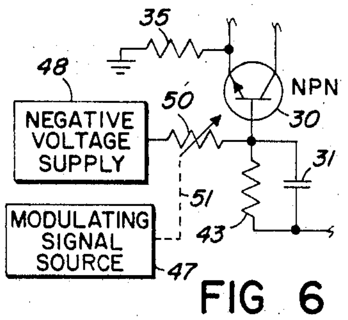
Figure 7:
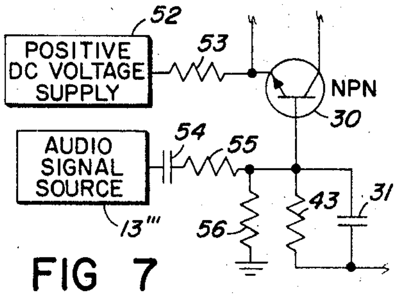

Referring now to the embodiment of FIGURE 6, capacitor 31 and resistor 43 are arranged just as with the corresponding elements of FIGURE 4, and a negative voltage source 48 such as employed with the embodiment of FIGURE 5 is connected through a variable value resistor 50 to the common junction of resistor 43, capacitor 31 and the base of NPN transistor 30. A modulating signal source 47 is equipped with a mechanical drive 51 connection to vary the value of variable resistor 50 in accordance with the modulating signal from modulating signal source 47.

Referring now to another embodiment, as shown in FIGURE 7, wherein, here again, portions of the circuit not shown as substantially the same as those in the embodiment of FIGURE 3, a positive DC voltage supply 52 is connected through resistor 53 to the emitter of NPN transistor 30 in place of the connection through a resistor 35 to ground. Further in this embodiment, an audio signal source 13‴ is connected serially through capacitor 54 and resistor 55 to the common junction of resistor 43, capacitor 31 and the base of NPN transistor 30, and further, this common junction is connected through a resistor 56 to ground.

The signal modulated self-regulated voltage regulator-amplifier circuit of FIGURE 8 is an AC signal modulated embodiment developing an AC power output signal as opposed to the other embodiments hereinbefore described that developed modulated DC power output signals. In this FIGURE 8 embodiment, a positive DC power supply 12 is connected to the collector of "on"-"off" switch acting NPN transistor 15′ which, with its connection to the "bang-bang" switching control circuit 18″, is, to at least some extent, the switching equivalent of switching circuit 15 of FIGURE 1. The output emitter of NPN transistor 15′ is connected through coil 26′ and, serially, through AC power signal coupling capacitor 57 to output load 14′. The connection between coil 26′ and the signal output coupling capacitor 57 is connected through capacitor 27′ to ground, and with the coil 26′ and capacitor 27′ forming, substantially, the equivalent of the filter circuit 16 of FIGURE 1. The connection between coil 26′ and the AC power output signal coupling capacitor 57 is connected through a feedback line to and through parallel connected resistor 58 and capacitor 59 to the base of NPN transistor 30′. A negative DC voltage supply 60 is connected through serially connected resistors 61 and 62 to the common junction of the base of transistor 30′, resistor 58 and capacitor 59. Further, the AC signal modulating source 63 is connected for applying an AC modulating input signal to the common junction of resistors 61 and 62. The emitter of NPN transistor 30′ is connected both through resistor 35′ to ground, and to the emitter of NPN transistor 36′. The base of NPN transistor 36′ is connected through resistor 64 and capacitor 65 in parallel to ground, and also through resistor 66 to the collector of NPN transistor 30′. The common junction of resistor 66 and the collector of NPN transistor 30′ is connected through resistor 67 to the output of positive DC power supply 12, and also through resistor 68 to the base of NPN transistor 69. The collector of NPN transistor 36′ is connected through resistor 38′ to the base of NPN transistor 39′, the emitter of which is connected to the output of positive DC power supply 12. Further, the base of transistor 39′ is also connected through resistor 40′ to the output of positive DC power supply 12, and the collector output is connected to the base of "on"-"off" switching NPN transistor 15′. While the emitter of NPN transistor 69 is connected to ground, the collector thereof is connected to the base of NPN transistor 70 and also through resistor 71 to the output of the positive DC power supply 12. The emitter of NPN transistor 70 is also connected to ground, and its collector is connected to the common junction of the emitter of switching transistor 15' and choke coil 26'. This common connection is also connected through resistor 71 to the common junction of the collector of PNP transistor 39' and the base of NPN switching transistor 15', and also through diode 42' to ground with diode orientation cathode to the common junction and anode to ground.

During operation of the AC modulated self-regulated voltage regulator-amplifier circuit embodiment of FIGURE 8, under the condition of no modulating signal input when power is first applied from positive DC power supply 12, NPN transistor 30' is in the "off" state. This allows NPN transistors 36' and 69 to turn on through bias resistors 67, 66 and 68. Transistor 36' in the "on" state conducts through resistor 38' and helps develop a turn on voltage bias for PNP transistor 39' which, with turn on biases "on"-"off" switching NPN transistor 15' to the switched on state. This effectively connects the output of the positive DC power supply 12 through transistor 15' to choke coil 26'. Obviously, current increase in choke coil 26' and the voltage rise after choke coil 26' occur at rates as determined by choke coil 26' impedance, the value of capacitor 27', the value of AC power output signal passing capacitor 57, and the load impedance of output circuit 14'. Simultaneously, as long as NPN transistor 69 is biased to the "on" state, NPN transistor 70 is maintained in the turned off state with NPN transistor 69 maintaining a base-to-emitter shorting path across NPN transistor 70. Generally speaking, the capacitive reactance of the DC blocking capacitor 57 is negligible for substantially all frequencies of concern with this embodiment.

It should be noted that in order to optimize the AC power output capabilities of the circuit that the minus DC voltage supply 60 is set at a voltage so that the current through resistors 61 and 62 is approximately equal to current in resistor 58 when the charge on capacitor 27' is equal to approximately one-half- of the output voltage of positive DC power supply 12. Such a setting of the minus DC voltage supply 60 and balance of current flows through the resistors 61 and 62 and resistor 58 to the common junction at the base of NPN transistor 30' biases this transistor 30' to turn on when the DC voltage across capacitor 27' is approximately one-half the output voltage of positive DC power supply 12. When NPN transistor 30' is thereby biased to conduction, NPN transistor 36', PNP transistor 39', "on"-"off" switching transistor 15' and NPN transistor 69 are turned off. Upon turn off of NPN transistor 69, NPN transistor 70 is substantially immediately biased to the conductive state to thereby clamp the input voltage of choke coil 26' to approximately ground potential. Diode 42', which in the form of diode 42 in the embodiment of FIGURE 3 was a free-wheeling voltage clamp for choke coil 26 in that embodiment, is still a free-wheeling diode protecting transistor 70 from any negative transients. When NPN transistor 70 is in the conductive state and clamps the choke coil 26' to ground, current in the choke decreases until the voltage across capacitor 27' drops to a point where transistor 30' is turned off, with the cycle thereafter being repeated time after time in the same sequence. Thus, voltage across capacitor 27' is being continuously regulated to stabilize at a DC potential approximating one-half the output voltage of the positive DC power supply 12 with a small high frequency ripple voltage coincident in frequency with the cyclic frequency of operation superimposed upon the stabilized voltage. It should be noted that capacitor 59 in the feedback circuit aids in coupling the ripple voltage on the voltage across capacitor 27' to the base of NPN transistor 30'.

With the optimized setting of minus DC voltage supply 60 for balanced current flow through resistors 61 and 62 and resistor 58 in the feedback circuit and application of an AC modulating signal from AC signal modulating source 63 to the junction of resistors 61 and 62 the switching threshold of transistor 30' is thereby altered. This results in the DC voltage level across capacitor 27' being driven to assume a new level to maintain regulated "on" and "off" switching of transistor 30' and of the "on"-"off" switching transistor 15'. This results in the charge on capacitor 27' following the AC input signal waveform with these AC variations in the voltage across capacitor 27' being tightly and efficiently coupled through capacitor 57 to the output load circuit 14'. Thus, a very high power AC output is provided with an extremely high gain factor from a low power AC input signal particularly with AC power output load resistance being much smaller than AC modulating signal input impedance, and with the AC power output signal subject to substantially constant regulation to the input AC modulating signal.

It should be noted that NPN transistor 70 is really necessary only for the development of AC power output to insure complete switching of the choke coil 26' input voltage to ground when the choke coil current is at zero or in a reverse direction. That is, in order to bring the load voltage downward in a negative direction requires the running of current from the load back through the choke coil and through transistor 70 to ground. This sort of provision would not be necessary for a direct coupled output as the choke coil current is always in the same direction, as is apparent in the DC voltage developing embodiments, so that the snap-back action of the choke coil operates a free-wheeling diode in such other embodiments. Such a diode as diode 42' in this AC coupled circuit would not always operate in the free-wheeling sense as with the diode 42 in the other embodiments, and this gives rise to the requirement for transistor 70. It should be noted that AC power output coupling capacitor 57 would not always be necessary with some AC power output developing embodiments if the load return were to a center tap on the power supply.

Thus, there are hereby provided various improved voltage regulator-amplifier embodiments utilizing self oscillating with feedback to a "bang-bang" control circuit with a discontinuous amplitude action feedback loop. This insures maximum frequency response along with a substantially continuous regulating action with mixing of the output and input signals in a signal mixer combining network inside the feedback loop. Since the action of the switching control circuit is that of a "bang-bang" type circuit in a regulating action such that it maintains feedback current into the bias control circuit substantially constant with, of course, the ripple controlling factor present. This in effect gives rise, quite advantageously, to an amplification action of considerable gain (to a very high degree by design if desired) particularly, with the modulating input signal being across a relatively high resistance (impedance) and the output across relatively low resistance (impedance). Power gain for the improved voltage regulator-amplifiers may be computed by the following formula:

$$\text{Power gain} = \frac{V^2_{out} R_{in}}{V^2_{in} R_{out}}$$

with $V_{in}$ being the voltage of the modulating signal input and $R_{in}$ being the impedance to that signal, and $V_{out}$ being the output voltage level and $R_{out}$ being the output impedance to the output voltage.

Further, it should be noted that a low power modulating input signal is capable of controlling a large amount of output power with inherently good linearity since there are no active elements employed in the feedback path and in the modulation signal input and feedback signal mixer portions of the feedback circuit of the various regulator-amplifier embodiments. At all times the controlled (or modulated power output) output is a regulated voltage power output with respect to both input modulating voltage signals and load variations, so long as the positive DC power supply voltage is higher than the maximum desired DC output voltage.

Whereas this invention is here illustrated and described with respect to several embodiments thereof, it should be realized that various changes may be made without departing from essential contributions to the art made by the teachings hereof.

We claim:

1. In a signal modulated self-regulated voltage regulator-amplifier circuit: a switching circuit including "on"-"off" switch means, and output signal means; a DC power supply connected to said switching circuit; output signal path means extending from the output signal means of said switching circuit; a voltage level responsive switching control circuit of the "bang-bang" type connected to said switching circuit for control of said "on"-"off" switch means; a combined feedback and signal mixer circuit interconnecting said output signal path means and said switching control circuit; a filter circuit capable of converting a signal to a DC regulating voltage during operation located between said output signal means of the switching circuit and combined feedback and signal mixer circuit means; and a modulating signal source connection in the combined feedback and signal mixer circuit.

2. The signal modulated self-regulated voltage regulator-amplifier circuit of claim 1, wherein said filter circuit is positioned in said output signal path means.

3. The signal modulated self-regulated voltage regulator-amplifier circuit of claim 1, including impedance means in the feedback path, and wherein the total impedance in the feedback path of said combined feedback and signal mixer circuit is such as to insure that power drain from the output signal path means required for feedback be, at most, a very small fraction of the output signal power level during operation.

4. The signal modulated self-regulated voltage regulator-amplifier circuit of claim 3, wherein the ratio of the total impedance in the feedback path to the signal output load impedance for the regulator-amplifier is, at least a 10:1 impedance ratio.

5. The signal modulated self-regulated voltage regulator-amplifier circuit of claim 4, wherein the modulating signal input voltage and circuit impedance to the modulating signal input are such that modulating signal input power requirements are very low relative to the output signal power level during operation.

6. The signal modulated self-regulated voltage regulator-amplifier circuit of claim 3, with said impedance means in the feedback path including a resistor.

7. The signal modulated self-regulated voltage regulator-amplifier circuit of claim 6, wherein said resistor is an adjustable resistor; and a modulating signal source is connected to the resistor for adjusting the resistor in accordance with a modulating signal input.

8. The signal modulated self-regulated voltage regulator-amplifier circuit of claim 6, wherein a DC voltage source is connected to said combined feedback and signal mixer circuit between said resistor and said switching control circuit.

9. The signal modulated self-regulated voltage regulator-amplifier circuit of claim 6, including a second DC voltage source; and an adjustable value resistor between said second DC voltage source and said combined feedback and signal mixer circuit; and a modulating signal source connected for adjusting the adjustable value resistor in accordance with a modulating signal input.

10. The signal modulated self-regulated voltage regulator-amplifier circuit of claim 3, with an audio signal source connected to the combined feedback and signal mixer circuit between said resistor and said switching control circuit.

11. The signal modulated self-regulated voltage regulator-amplifier circuit of claim 6, including a second DC voltage supply connected through impedance means to the combined feedback and signal mixer circuit between said resistor and the switching control circuit; and an AC modulating signal source is connected to the combined feedback and signal mixer circuit between said resistor and the switching control circuit.

12. The signal modulated self-regulated voltage regulator-amplifier circuit of claim 3, with said impedance means in the feedback path including a coil with said coil being the secondary coil of a modulating signal input transformer including a primary coil; and a modulating signal source connected to the primary coil of said transformer.

13. The signal modulated self-regulated voltage regulator-ampilfier circuit of claim 12, including a voltage reference level limit determining diode in the feedback path of said combined feedback and signal mixer circuit.

14. The signal modulated self-regulated voltage regulator-amplifier circuit of claim 1, wherein said "on"-"off" switch means is a solid state electronic type switch.

15. The signal modulated self-regulated voltage regulator-amplifier circuit of claim 14, wherein said "on"-"off" switch means is a transistor.

16. The signal modulated self-regulated voltage regulator-amplifier circuit of claim 1, including a diode clamp between said output signal path means between said filter circuit and said output signal means and, on the other side, to a voltage potential reference.

17. The signal modulated self-regulated voltage regulator-amplifier circuit of claim 1, also including an additional "on"-"off" switch connected to said output signal means, and to a voltage potential reference, and having connections to said switching control circuit for voltage bias trigger control of circuit voltage potential connections for opposite on-off switch cycling with respect to said "on"-"off" switch means.

References Cited

UNITED STATES PATENTS

| | | | |
|---|---|---|---|
| 3,209,237 | 9/1965 | Wiest | 323—22 |
| 3,328,674 | 6/1967 | Bleicher | 323—22 |

OTHER REFERENCES

Riordon, "Power Supply Uses Switching Preregulation," Electronics, Mar. 9, 1962, pp. 62–64.

ROY LAKE, *Primary Examiner.*

JAMES B. MULLINS, *Assistant Examiner.*

U.S. Cl. X.R.

307—297; 323—38

UNITED STATES PATENT OFFICE

CERTIFICATE OF CORRECTION

Patent No. 3,426,266

February 4, 1969

Willis E. Day et al.

It is certified that error appears in the above identified patent and that said Letters Patent are hereby corrected as shown below:

Column 5, line 20, "2N2849" should read -- 40 volts --; line 21, "40 volts" should read -- 2N2849 --; line 43, "nal" should read -- signal --; line 66, "wath" should read -- with --. Column 6, line 40, after "load" insert -- circuit --; line 65, "NPN" should read -- PNP --. Column 7, line 39, "one-half- should read -- one-half --.

Signed and sealed this 24th day of March 1970.

(SEAL)
Attest:

Edward M. Fletcher, Jr.
Attesting Officer

WILLIAM E. SCHUYLER, JR.
Commissioner of Patents